Figure 1:
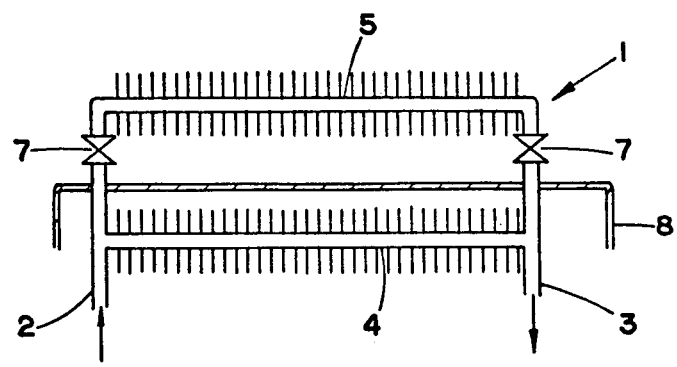

United States Patent [19]
Bronicki

[11] 3,882,929
[45] May 13, 1975

[54] HEAT REJECTION SYSTEM
[75] Inventor: Lucien Yehuda Bronicki, Rehovoth, Israel
[73] Assignee: Ormat Turbines (1965) Ltd., Yavne, Israel
[22] Filed: Aug. 16, 1973
[21] Appl. No.: 388,862

[52] U.S. Cl. .................................. 165/40; 165/111
[51] Int. Cl. ............................................. B60h 1/00
[58] Field of Search ........... 165/111, 1, 40, 101, 40, 165/39; 123/41.09, 41.1

[56] References Cited
UNITED STATES PATENTS
3,716,097  2/1973  Keln et al. .......................... 165/111

Primary Examiner—Charles Sukalo
Attorney, Agent, or Firm—Ladas, Parry, Von Gehr, Goldsmith & Deschamps

[57] ABSTRACT

A heat rejection system for a circulating fluid, e.g., an engine cooling system. The system comprises two sections connected in parallel via temperature responsive control means. One of the sections is insulated and it is connected to the fluid input and output conduits. Normally both sections are available for cooling. However, when the ambient temperature drops below a predetermined value the non-insulated section is cutoff.

1 Claim, 3 Drawing Figures

HEAT REJECTION SYSTEM

This invention relates to a heat rejection system such as, for example, a cooling system for a motor car engine, compressor or the like.

With known heat rejection cooling systems of this kind a coolant fluid is employed which circulates through the equipment to be cooled and which then has its heat rejected by means, for example, of a radiator. The danger, however, exists when operating at low temperatures that the circulating fluid freezes thereby rendering inoperative the entire system. Various proposals have been made to minimize this danger such as, for example, by mixing the fluid with an anti-freeze solution, but such proposals are of limited value.

It is an object of the present invention to provide a new and improved heat rejection system in which the above referred to dangers and disadvantages are substantially reduced or overcome.

According to the present invention there is provided a heat rejection system comprising a fluid flow circuit and having circuit input and output between which fluid, whose heat is to be rejected, is adapted to flow and including at least two heat exchange sections connected in parallel via temperature responsive communication control means and insulation means for imparting to one heat exchange section an increased heat insulation as compared with the other section and said control means.

Thus, with such a heat rejection system once the ambient temperature has dropped below a certain level the temperature responsive communication control means operate so as to direct the flow of the fluid through said relatively insulated heat exchange section and to prevent the flow through the other heat exchange section. On the other hand, when the ambient temperature is above said certain level heat rejection is effected by flow through both heat exchange sections. In this way, it is ensured that the heat rejection system remains operative even at the lowest operating temperature.

The temperature responsive communication control means can preferably be constituted by thermostatically controlled valves which are arranged to interrupt throughflow once the temperature has dropped below a certain level. Alternatively, the control means can be constituted by conduit sections of relatively reduced cross-sectional areas which become rapidly blocked by frozen fluid once the ambient temperature has dropped below said certain level.

It is to be understood that the insulation means is such that said one heat exchange section remains adequately insulated at all conceivable temperatures at which the system is designed to operate and in this way the freezing of the fluid flowing through this heat exchange section is prevented.

The heat rejection system in accordance with the invention can form part of an engine cooling system under which circumstances the heat exchange sections are respectively constituted by engine radiators separated by an appropriate heat insulating partition.

Figure 2:
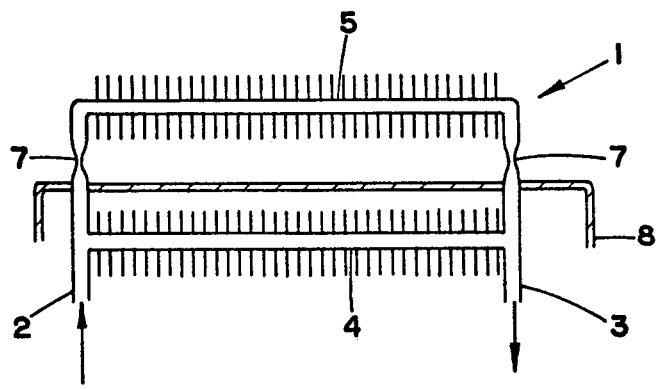
Figure 3:
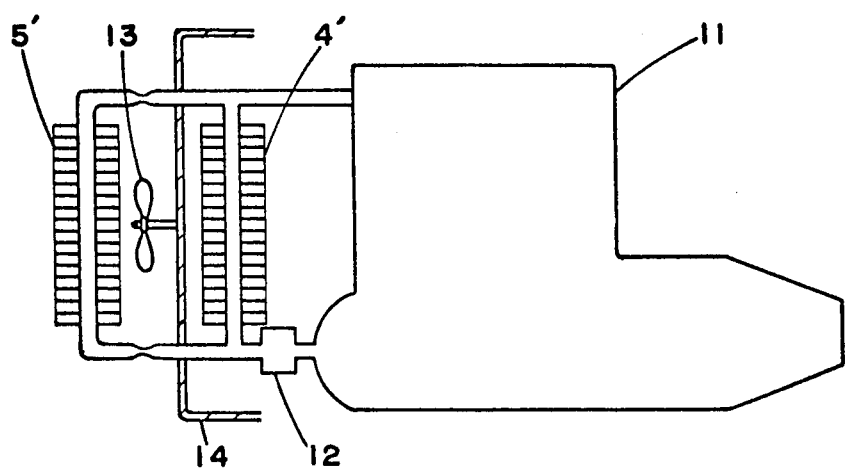

For a better understanding of the present invention and to show how the same can be carried out in practice, reference will now be made to the accompanying drawings, in which:

FIGS. 1 and 2 are respective schematic representations of heat rejection systems in accordance with the present invention; and FIG. 3 is a schematic representation of an engine cooling system employing a heat rejection system in accordance with the present invention.

As seen in FIG. 1 of the drawings a heat rejection system comprises a fluid flow circuit 1 having an input 2 and an output 3 and comprising first and second heat exchange sections 4 and 5 respectively provided with heat radiating fins and connected in parallel via thermostatically controlled valves 7. A heat insulating partition 8 separates the heat exchange section 4 from the heat exchange section 5 and the thermostatically controlled valves 7.

The heat rejection system illustrated in FIG. 2 is similar to that shown in FIG. 1 with the exception that the thermostatically controlled valves are replaced by conduit sections of relatively reduced cross-sectional areas.

During warm weather operation fluid flowing through the system is free to flow through both sections 4 and 5 and has available to it these two sections for heat rejection. During cold weather operation, however, and when the temperature has fallen below a certain minimum level, the thermostatic valves 7 (in the embodiment shown in FIG. 1) operates so as to block the flow of fluid through the heat exchange section 5 where it could freeze and flow only takes place through the relatively insulated section 4 where the insulation is sufficient to prevent freezing at all reasonable operating temperatures.

In the embodiment shown in FIG. 2, when the temperature has dropped below said certain minimum level freezing takes place in the conduit sections of reduced cross sectional area and in a similar manner flow through the exposed heat exchange section 5 is prevented and all flow takes place through the relatively insulated heat exchange section 4.

FIG. 3 shows a heat rejection system in the form of an engine cooling system. In this case the heat exchange sections 4 and 5 consist of air cooled radiators 4' and 5', the output of the fluid control circuit being coupled to an engine 11 via a coolant pump 12 whilst the usual fan 13 is mounted externally of an insulated wall 14, the two sections being again coupled via conduit sections of relatively reduced cross-sectional areas. The operation of this engine cooling system is similar to that described above. Thus, in warm weather conditions cooling takes place through both radiators 4' and 5' whilst in cold weather conditions when the temperature has dropped below a level wherein freezing takes place at the reduced cross-sectional positions of the conduits, flow of the coolant fluid is effected only through the radiator 4'.

I claim:

1. A heat rejection system for a freezable circulating fluid, comprising two heat exchange sections connected in parallel with the intermediary of temperature responsive control means in the form of a conduit having a portion of reduced cross-section that enhances the local freezing of the fluid thereby blocking its flow between the heat exchange sections when the ambient temperature is below the freezing point of the fluid.

* * * * *